United States Patent
Wu

(10) Patent No.: US 6,722,052 B2
(45) Date of Patent: Apr. 20, 2004

(54) STRUCTURE OF PLATE POSITIONING ARRANGEMENT

(75) Inventor: Ming-De Wu, Taipei Hsien (TW)

(73) Assignee: Techmech Technologies Corp., Taipei Hsien (TW)

( * ) Notice: Subject to any disclaimer, the term of this patent is extended or adjusted under 35 U.S.C. 154(b) by 0 days.

(21) Appl. No.: 10/321,374

(22) Filed: Dec. 18, 2002

(65) Prior Publication Data

US 2004/0003508 A1 Jan. 8, 2004

(30) Foreign Application Priority Data

Jul. 4, 2002 (TW) ..................................... 91210180 U

(51) Int. Cl.[7] .............................. G01B 5/24; B43B 11/00
(52) U.S. Cl. .............................. 33/613; 33/621; 411/383
(58) Field of Search .......................... 33/613, 645, 617, 33/620, 621, 623; 411/383

(56) References Cited

U.S. PATENT DOCUMENTS

| | | | | | |
|---|---|---|---|---|---|
| 3,078,754 A | * | 2/1963 | DeLacy | ...................... | 411/383 |
| 3,212,181 A | * | 10/1965 | Henle | .......................... | 33/613 |
| 4,538,355 A | * | 9/1985 | Morghen | ..................... | 33/613 |
| 4,810,148 A | * | 3/1989 | Aisa et al. | ................... | 411/383 |
| 4,819,340 A | * | 4/1989 | DeForrest | ..................... | 33/613 |
| 4,936,023 A | * | 6/1990 | Pechak | ........................ | 33/613 |
| 4,989,340 A | * | 2/1991 | Dawson | ........................ | 33/645 |
| 5,138,772 A | * | 8/1992 | Barnes | ......................... | 33/613 |
| 5,167,464 A | * | 12/1992 | Voellmer | ..................... | 33/645 |
| 5,391,033 A | * | 2/1995 | Gibbons | ..................... | 411/383 |
| 5,592,746 A | * | 1/1997 | Ternes | ......................... | 33/623 |
| 5,970,621 A | * | 10/1999 | Bazydola et al. | ............. | 33/613 |
| 5,992,028 A | * | 11/1999 | Wing | ........................... | 33/613 |
| 6,505,413 B2 | * | 1/2003 | Tsutoh | ......................... | 33/613 |

* cited by examiner

Primary Examiner—G. Bradley Bennett
(74) Attorney, Agent, or Firm—Birch, Stewart, Kolasch & Birch, LLP

(57) ABSTRACT

A structure of plate positioning arrangement is disclosed. The structure of plate positioning arrangement comprises a shank extending at a bottom surface of a head of the positioning element, and a cap produced through a plastic injection molding process for covering and surrounding the edge of the head is for providing a receiving space below the head for fitting a fixing element. A through space is formed at a central region of the fixing element for fitting the shank of a positioning element, wherein the shank is fixed with a resilient element. Thus the cap is capability to allow the positioning element move in the same way within the through space of the fixing element.

7 Claims, 5 Drawing Sheets

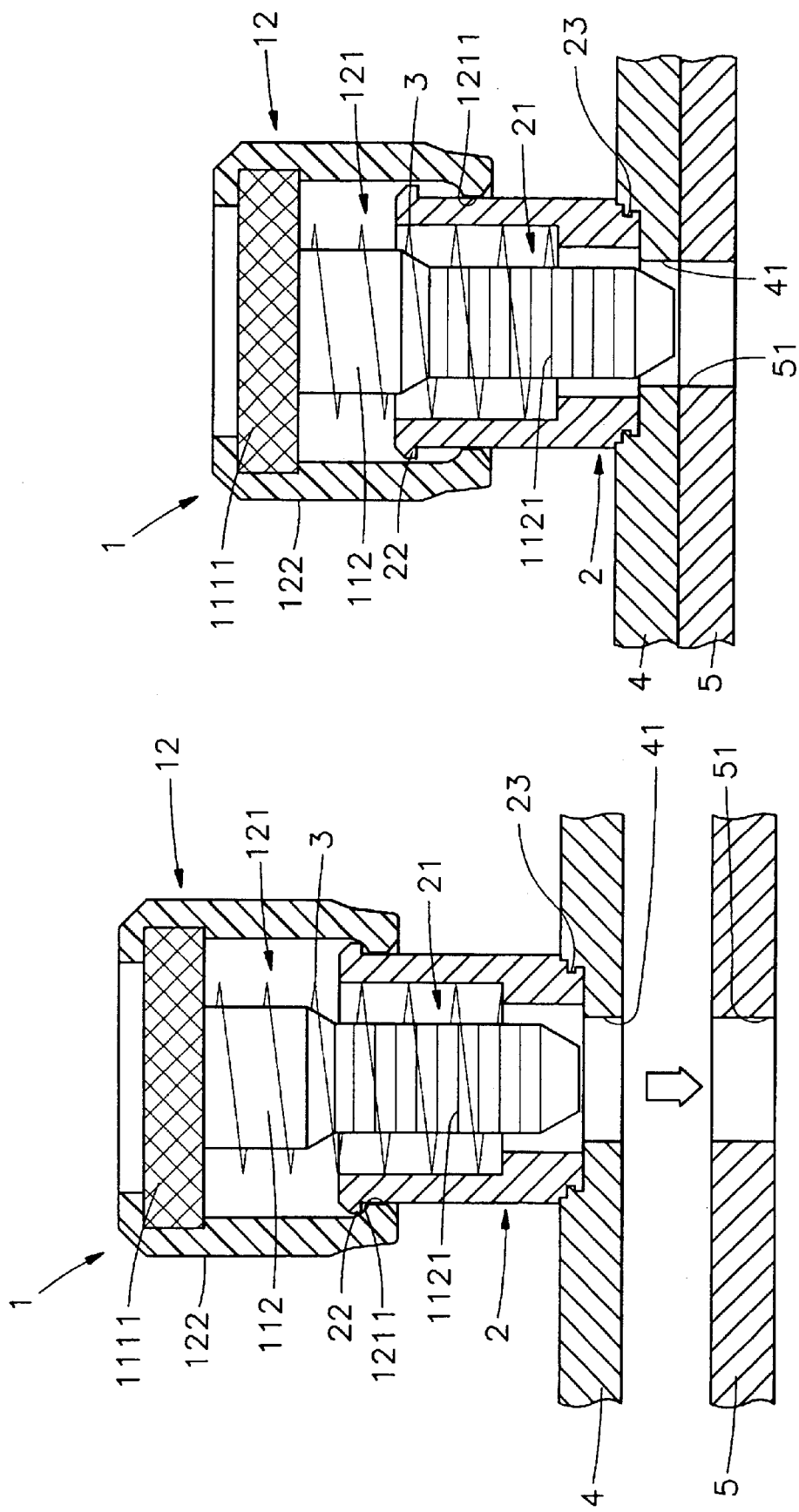

STRUCTURE OF PLATE POSITIONING ARRANGEMENT

BACKGROUND OF THE INVENTION

1. Field of the Invention

The present invention relates to the structure of plate positioning arrangement, and more particularly relates to a cap made of a plastic material for covering around the head of a positioning element, for providing a horizontal motion capability to the positioning element within a through space of a fixing element after the positioning element secured by the fixing element.

2. Description of the Related Art

Due to continuous development of the industry, the process and manufacture of many products require various work facilities, for example, lathe, miller, driller and flusher facilities. However, the mechanical device or speed adjustment device of these facilities is usually located inside a case. For the convenience of maintenance or speed adjustment during the operation of the facility, a movable plate is provided on the outer case of these devices so that the maintenance personnel may get access the devices. The conventional scheme of fitting such a movable plate use a plurality of threaded elements to directly fix the movable plate onto the facility. However, such kind of fitting scheme has defects due to the negligence of the operator. Besides, the threaded element is easy to be misplaced while disassembling the movable plate. Therefore, an improved method for avoiding such a defect has been disclosed as by using a positioning element, which comprises a cap, a threaded portion and a positioning set for buckling to apertures of the movable plate, and the threaded portion is for securing onto another plate. When disassembling the movable plate, the positioning element can be still secured to the apertures of the movable plate by the positioning set, thus the positioning element will not be misplaced. However, since the cap of this conventional positioning element is made of a metal, therefore a pressing process is required to substantially secure the threaded portion within the positioning portion after fitting the threaded portion into the positioning portion of the cap. For enhancing the grip for allowing the operator to use his/her hand to turn the cap for assembling or disassembling of the movable plate, there is a need for performing a gripping process on the outer flange of the cap by using a gripping facility. Because the cap is made of a metal, and therefore the color of such cap is merely metallic and usually mismatch with that of the movable plate or facility. Furthermore, if the operator uses greasy hands while assembling or disassembling the movable plate, it would be difficult to turn the cap. Besides, the process for manufacturing the conventional positioning structure is more complicated, and therefore to produce such positioning element is accordingly more costly and difficult.

SUMMARY OF THE INVENTION

Accordingly, in the view of the foregoing, the present inventor makes a detailed study of related art to evaluate and consider, and uses years of accumulated experience in this field, and through several experiments, to create a new structure of plate position structure having the features of easily visible together with better appearance of the present invention. The present invention provides an innovated cost effective which can manufactured using a more simplified process.

In accordance with the above objects and other advantages of the present invention as broadly embodied and described herein, the present invention provides a structure of plate positioning arrangement comprising a shank extending at a bottom surface of a head of the positioning element, and a cap produced through a plastic injection molding process for covering and surrounding the edge of the head for providing a receiving space below the head is for fitting a fixing element. A through space is formed at a central region of the fixing element for fitting the shank of a positioning element, wherein the shank is fixed with a resilient element. Thus the cap has a capability to allow the positioning element to move in the same way within the through space of the fixing element.

According to an aspect of the present invention a gripping portion at the flange of the head of the positioning element is provided for securing the positioning element onto the wall of the receiving space of the cap so as to avoid idling of the cap during operation.

According to another aspect of the present invention is to dispose a buckling portion around the head of the fixing element, and a buckling protrusion at an inner side of the bottom edge that is located in the receiving space of the cap. The buckling portion of the fixing element is for bearing on the buckling protrusion of the cap to prevent from slipping.

BRIEF DESCRIPTION OF THE DRAWINGS

For a more complete understanding of the present invention, reference will now be made to the following detailed description of preferred embodiments taken in conjunction with the accompanying drawings, in which:

FIG. 4 is a sectional side view showing before assembling the structure of plate positioning arrangement of present invention to a plate;

FIG. 5 is a sectional side view showing while assembling the structure of plate positioning arrangement of present invention to a plate;

DESCRIPTION OF THE PREFERRED EMBODIMENTS

Figure 1:
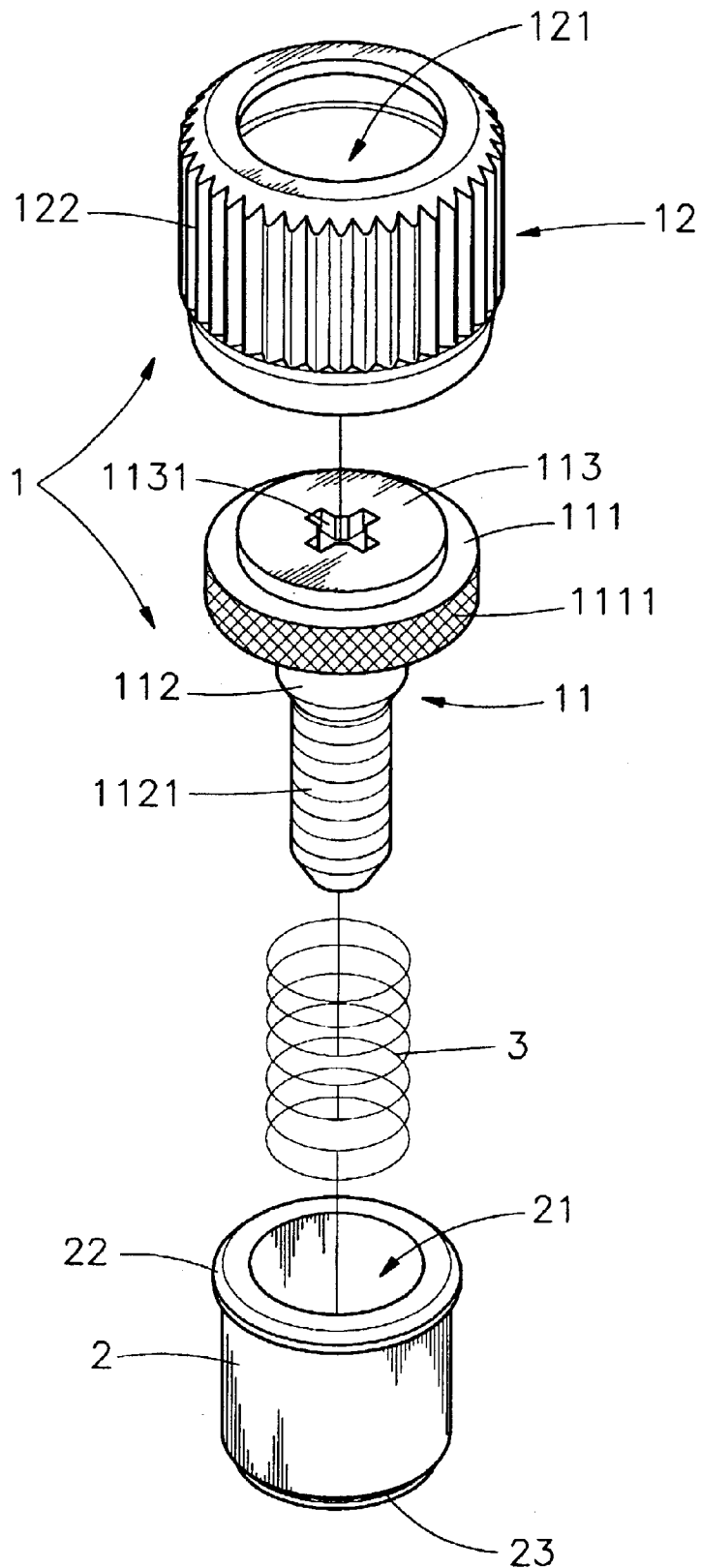
FIG. 1 is an exploded view of the structure of plate positioning arrangement of the present invention.

Reference will be made in detail to the preferred embodiments of the invention, examples of which are illustrated in the accompanying drawings. Wherever possible, the same reference numbers are used in the drawings and the description to refer to the same or like parts.

Figure 2:
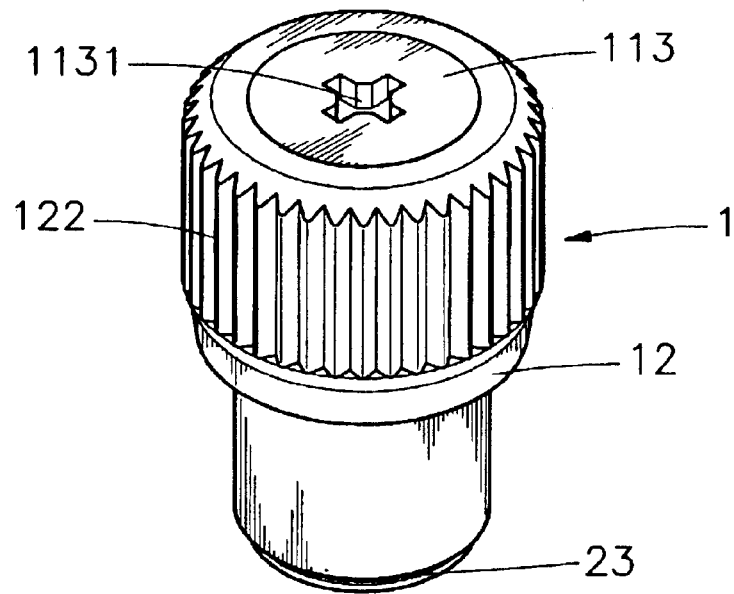
FIG. 2 is an elevational view of the structure of plate positioning arrangement according a preferred embodiment of the present invention.
Figure 3:
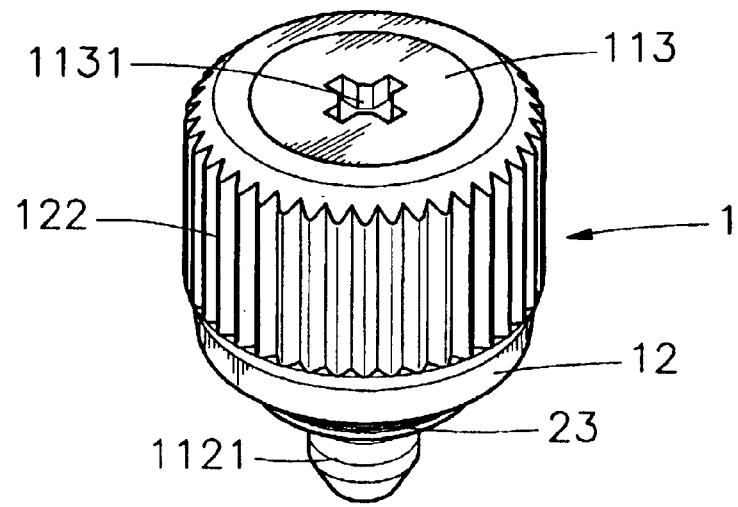
FIG. 3 is an elevational view of the structure of plate positioning arrangement showing the fixing element forced into the cap of the threaded element according a preferred embodiment of the present invention.

Referring to FIGS. 1, 2 and 3, the structure of plate positioning arrangement of the present invention comprises a threaded element 1 and a fixing element 2, wherein the threaded element 1 comprises a positioning element 11 having a shank 112 with a threaded portion 1121 extending at the bottom side of a head 111, and a gripping portion 1111 is formed surrounding the head 111. A cap 12 that is formed by a plastic injection molding process covers and surrounds around the flange of the head 111 of the positioning element 11 and forms a receiving space 121 below the head 111 of the positioning element 11. In addition, a plurality of protruded lid grips 122 is formed at an outer edge of the cap 12, and at the inner side of the bottom portion of the receiving space 121 of the cap 12 consists a buckling protrusion 1211. Furthermore, the head 111 of said positioning element 11 comprises a fitting portion 113, wherein the fitting portion 113 is formed with an indented slot 1131 visibly located on the topside of the receiving space 121 of the cap 12.

The fixing element 2 comprises a through space 21 for fitting a resilient element 3 and the shank 112 of the threaded element 1. Furthermore, a buckling portion 22 is formed surrounding the top flange and a plurality of the buckling grooves 23 is formed at the bottom flange of the fixing element 2.

To assemble the above-mentioned structure, an external force is applied for fitting the fixing element 2 into the receiving space 121 formed below the head 111 of the positioning element 11, thus the buckling portion 22 of the fixing element 2 will be supporting the buckling protrusion 1211 of the cap 12 for positioning and securing. The resilient element 3 and the shank 112 of the threaded element 1 can be fitted within the through space 21 of the fixing element 2, thus the cap 12 is able to make the positioning element 11 move in the same way within the through space 21 of the fixing element 2.

Figure 6:
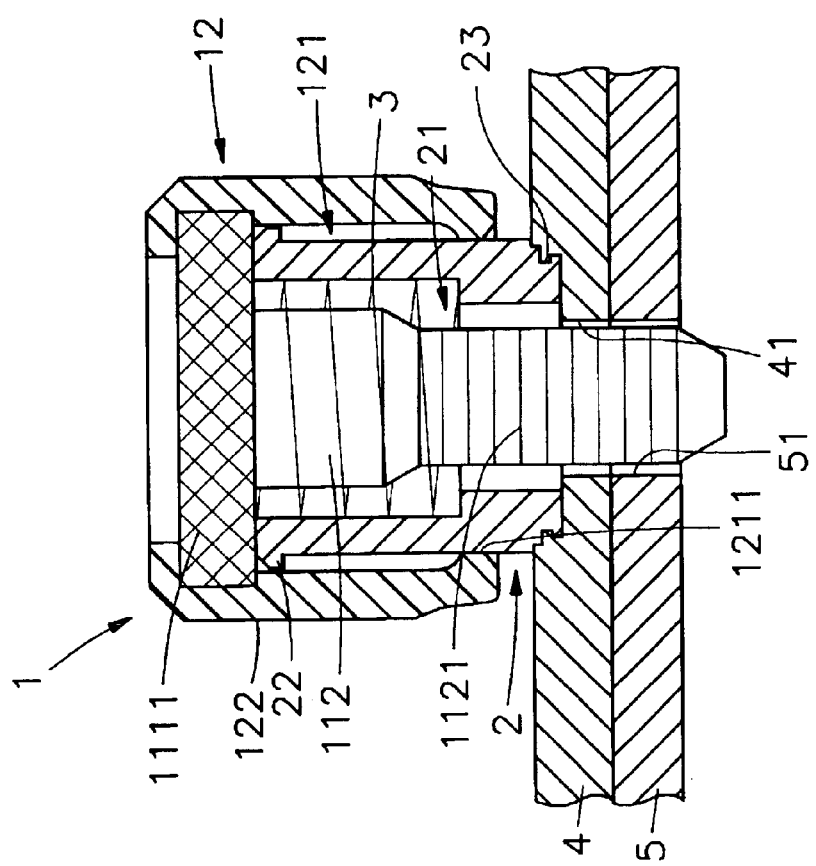
FIG. 6 is a sectional side view showing after assembling the structure of plate positioning arrangement of present invention to a plate.

Referring to FIGS. 4, 5 and 6, the actual application of the structure of the positioning arrangement of the present invention is described. The buckling groove 23 of the fixing element 2 is forced into a through hole 41 of a first plate 4 for securely fixing the fixing element 2 therewithin, then the cap 12 is pressed downwards to make the head 111 of the positioning element 11 to press on the resilient element 3 and can energized by the elasticity of the resilient element 3. The threaded portion 1211 of said shank 112 of the positioning element 11 is to fit into the aperture 51 of the second plate 5, then by turning the fixing element 12, the shank 112 of the positioning element 11 is threaded into the aperture 51 of the second plate 5 with the threading portion 1211 for fixing the first plate 4 securely onto a second plate 5.

Further, by using the slot 1131 formed on the fitting portion 113 and positioned on the head 111 of the positioning element 11 the plate to plate positioning is accomplished. Hand tools that correspond to the slot 1131 can be used to thread for assembly or disassembly purposes. Alternatively, hands may be used for turning the cap 12 by gripping the plurality of the protruded lid grips 122. After separating the plate, according to the present invention, the fixing element 2 can be securely positioned inside the aperture 41 of the first plate 4 with the buckling groove 23 to prevent from being misplaced.

Figure 7:
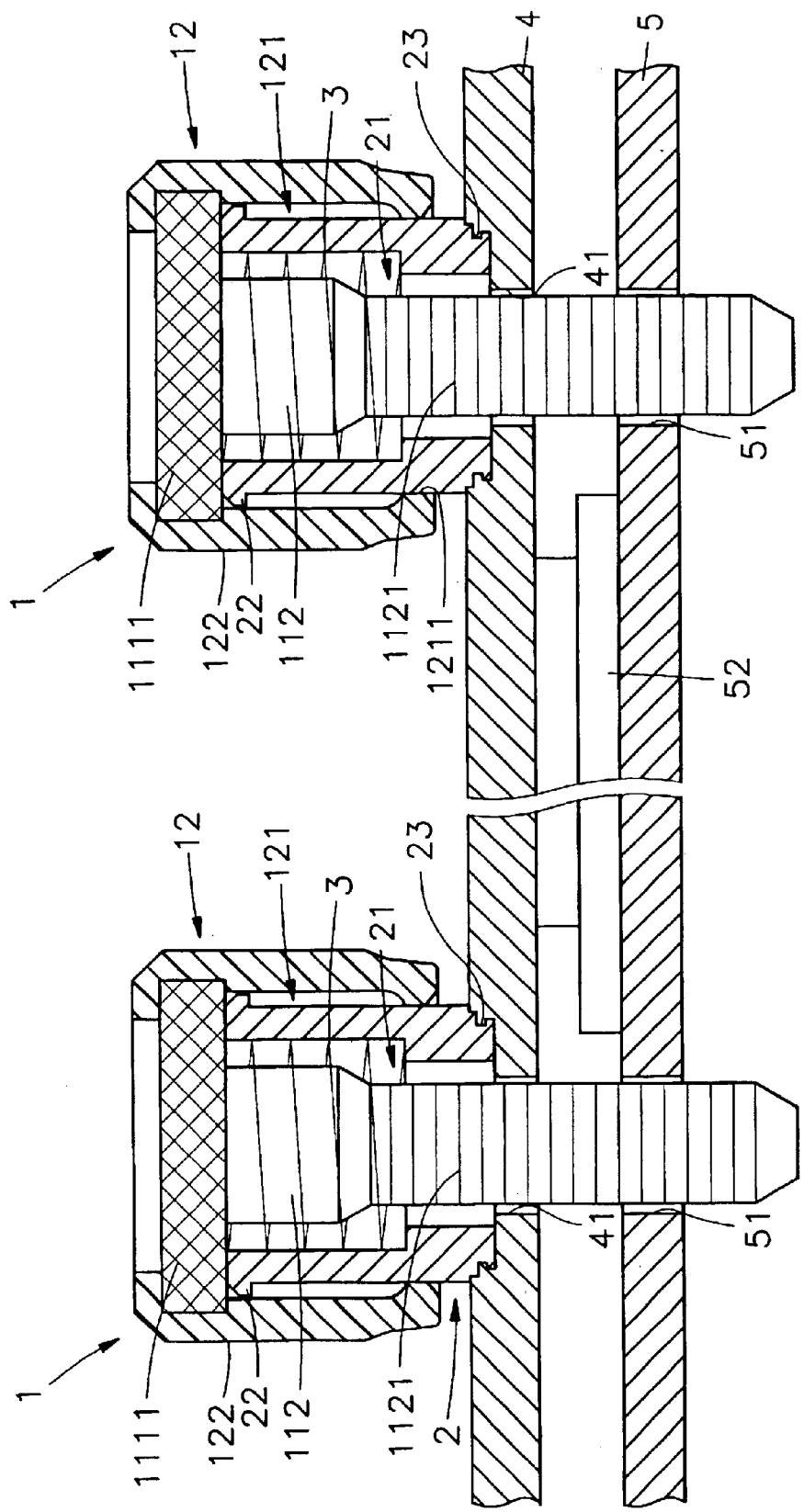
FIG. 7 is the sectional side view of the structure of plate positioning arrangement according another preferred embodiment of the present invention.

In addition, the present invention not only provides an embodiment to fix two plates together, and also to use a protruded element 52 disposed on the second plate 5 to make the first plate 4 and the second plate 5 to clap or bear on an upper and a lower surfaces of the protruded element 52, wherein the protruded element 52 can be a common spacer for separating the first and second plates 4 and 5, a central processor unit of the circuit board or other related elements (as shown in FIG. 7).

In summary, following are the advantages:

1) With the threaded element 1 comprising a shank 112 extending below the head 111 of the positioning element 11 and the cap 12 that is formed by the plastic injection molding process for covering on the flange of the head 111 of the positioning element 11, the procedure, the process, and the overall cost of manufacturing can be substantially reduced.

2) As the cap 12 is formed by a plastic injection molding process, and therefore the cap 12 can be made in a variety of colors suiting various usages and requirements, not only for embellishing the appearance but also for indicating the operator the disassembled or assembled status by using different colors.

3) The use of the gripping portion 1111 that is formed around the head 111 of the position element 11 is to bear on the wall of the receiving space 121 of the cap 12, and also to prevent idling of the cap 12 during operation.

4) By forcing the buckling groove 23 of the fixing element 2 into the aperture 41 of the first plate 4 to position the fixing element 2 securely within the aperture 41 of the first plate 4 the fixing element 2 can be effectively prevented coming off or being misplaced.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations, which fall within the spirit and scope of the included claims. All matters set forth herein or shown in the accompanying drawings are to be interpreted in an illustrative and non-limiting sense.

What the invention claimed is:

1. A structure of plate positioning arrangement, comprising:

a threaded element comprising a positioning element with a shank extending at a lower side of a head of the threaded element, around said head comprises a gripping portion, wherein a cap formed by a plastic injection molding process covering and surrounding a flange of the head of the threaded element, and a receiving space is formed below the head of the threaded element; and a fixing element for fitting within the receiving space of said cap, the fixing element comprises a through space at a central region for positioning a resilient element and the shank of the positioning element, thus the cap has a capability to allow the positioning element move in the through space of the fixing element.

2. The structure according to claim 1, wherein the head of said positioning element comprises a protruded fitting portion with an indented slot formed that is visibly located on a top side of the receiving space of the cap.

3. The structure according to claim 2, wherein a shape of the slot is one selected from a group consisting a flat, a cross, and a star type, to correspond to hand tools.

4. The structure according to claim 1, wherein the shank of said positioning element comprises a threaded portion.

5. The structure according to claim 1, wherein the cap comprises a plurality of lid grips at an outer flange.

6. The structure according to claim 1, wherein the fixing element comprises a buckling portion at the top flange, the receiving space of said cap comprises a buckling protrusion at an inner side of the bottom flange, and buckling portion of the fixing element bears on said buckling protrusion of the cap for positioning.

7. The structure according to claim 1, wherein the fixing element comprises a plurality of buckling grooves at a bottom edge thereof.

* * * * *